(12) United States Patent
Stouder et al.

(10) Patent No.: US 11,344,006 B2
(45) Date of Patent: May 31, 2022

(54) ERGONOMIC TRAINING HARNESS FOR DOGS

(71) Applicant: PetSmart Home Office, Inc., Phoenix, AZ (US)

(72) Inventors: Tanya Stouder, Queen Creek, AZ (US); Jamie L. Woods, Anthem, AZ (US)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 168 days.

(21) Appl. No.: 16/788,604

(22) Filed: Feb. 12, 2020

(65) Prior Publication Data

US 2020/0305394 A1    Oct. 1, 2020

Related U.S. Application Data

(60) Provisional application No. 62/825,152, filed on Mar. 28, 2019.

(51) Int. Cl.
*A01K 27/00* (2006.01)
*A01K 15/02* (2006.01)

(52) U.S. Cl.
CPC ............ *A01K 27/002* (2013.01); *A01K 15/02* (2013.01); *A01K 27/006* (2013.01); *A01K 2227/10* (2013.01)

(58) Field of Classification Search
CPC ..... A01K 27/002; A01K 27/006; A01K 27/00
See application file for complete search history.

(56) References Cited

U.S. PATENT DOCUMENTS

| 4,970,991 | A | * | 11/1990 | Luce | A01K 1/0263 119/771 |
| 8,166,924 | B2 | * | 5/2012 | Cho | A01K 27/002 119/792 |
| 8,182,300 | B2 | * | 5/2012 | Cosson | A01K 13/006 441/123 |
| 8,336,506 | B2 | * | 12/2012 | Zimmerman | A01K 1/0263 119/856 |
| 8,807,091 | B2 | * | 8/2014 | Min | A01K 27/002 119/856 |

(Continued)

FOREIGN PATENT DOCUMENTS

| AU | 2003255178 A1 | 5/2005 |
| CN | 2459885 Y | 11/2001 |

(Continued)

*Primary Examiner* — Kristen C Hayes
(74) *Attorney, Agent, or Firm* — Fox Rothschild LLP (57) ABSTRACT

An ergonomic training harness for use with an animal, the harness having a back panel with an outward-facing surface and an inward-facing surface and a chest panel with an outward-facing surface and an inward-facing surface. The harness also includes a chest strap having a first end and a second end, wherein each of the first end and the second end are coupled to the back panel. Additionally, the harness includes an underbelly strap coupled to the back panel, and a longitudinal strap coupled to the chest panel, the longitudinal strap having a first loop portion and a second loop portion. The chest strap is configured to pass through the first loop portion of the longitudinal strap and the underbelly strap is configured to pass through the second loop portion of the longitudinal strap.

20 Claims, 5 Drawing Sheets

(56) References Cited

U.S. PATENT DOCUMENTS

| | | | | |
|---|---|---|---|---|
| 10,271,521 | B2 * | 4/2019 | Chen | A01K 27/002 |
| D862,002 | S * | 10/2019 | Wu | D30/152 |
| 10,881,082 | B2 * | 1/2021 | Mills | A01K 27/002 |
| 11,102,958 | B1 * | 8/2021 | Chang | A01K 27/002 |
| 2010/0263602 | A1 * | 10/2010 | Cho | A01K 27/002 |
| | | | | 119/792 |
| 2010/0313825 | A1 * | 12/2010 | Friedland | A01K 13/006 |
| | | | | 119/850 |
| 2019/0110440 | A1 * | 4/2019 | Fuchs | B32B 3/06 |
| 2019/0364851 | A1 * | 12/2019 | Deluya | A01K 27/002 |
| 2020/0100469 | A1 * | 4/2020 | Elam | A01K 27/008 |
| 2020/0245592 | A1 * | 8/2020 | Wagner | A01K 27/005 |

FOREIGN PATENT DOCUMENTS

| | | |
|---|---|---|
| CN | 202773707 U | 3/2013 |
| CN | 203597220 U | 5/2014 |
| CN | 207151584 U | 3/2018 |
| EP | 1342631 A2 | 9/2003 |

\* cited by examiner

ERGONOMIC TRAINING HARNESS FOR DOGS

RELATED APPLICATIONS AND CLAIM OF PRIORITY

This patent document claims priority to U.S. Provisional Patent Application No. 62/825,152, filed Mar. 28, 2019, the disclosure of which is fully incorporated into this document by reference.

FIELD OF THE INVENTION

The present disclosure relates generally to animal harnesses and, more particularly, to an ergonomic training harness for use with dogs.

BACKGROUND

Specialized harnesses have long been used during the training of dogs for obedience, service tasks, etc. These harnesses have generally utilized a back panel configured to drape over or behind the dog's shoulders, a releasable underbelly strap, and a chest strap, thereby allowing for the harness to be secured on the animal at multiple points. In many cases, the back panel has included a handle portion to allow the trainer or another person handling the dog to physically restrain or direct the dog via the harness itself. The back panel also generally includes an attachment means such as a D-ring, which allows a leash or other tether to be coupled to the back panel of the harness. In some instances, the training harnesses are utilized only temporarily, until the dog is determined to be properly obedient. However, in other instances, the training harnesses may be worn regularly by the dog, regardless of their level of obedience.

While existing training harnesses have provided improved user control as compared to conventional collars, they do have several drawbacks. Namely, despite the presence of an underbelly strap, much of the pressure applied when a dog pulls on the harness is concentrated on the chest strap, which increases the risk of choking or other discomfort to the dog. Furthermore, the back panel of many training harnesses is not sized for larger dogs and/or dogs with broad chests, and the chest straps have minimal adjustability, leading to potential discomfort for the dogs and/or difficulty in affixing the harness.

Accordingly, devices that are intended to address the issues discussed above and/or other issues are presented herein.

SUMMARY OF THE INVENTION

In accordance with one aspect of the disclosure, an ergonomic training harness for use with an animal is disclosed. The harness may include a back panel having an outward-facing surface and an inward-facing surface. The harness may also include a chest panel having an outward-facing surface and an inward-facing surface, and a chest strap having a first end and a second end, wherein each of the first end and the second end are coupled to the back panel. The harness may further include an underbelly strap coupled to the back panel, as well as a longitudinal strap coupled to the chest panel, the longitudinal strap having a first loop portion and a second loop portion. The chest strap may be configured to pass through the first loop portion of the longitudinal strap, and the underbelly strap may be configured to pass through the second loop portion of the longitudinal strap.

In accordance with another aspect of the disclosure, an ergonomic training harness for use with an animal is disclosed. The harness may include a back panel and a chest panel. The harness may further include a chest strap attached to the back panel and removably coupled to the chest panel, as well as an underbelly strap attached to the back panel and removably coupled to the chest panel. The back panel may include a scoop portion configured to be positioned at or near a head of the animal, the scoop portion extending between 20% and 50% of an overall length of the back panel.

DETAILED DESCRIPTION

The following description is made for the purpose of illustrating the general principles of the present apparatus and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a training harness is oriented as shown in the Figures.

Figure 1:
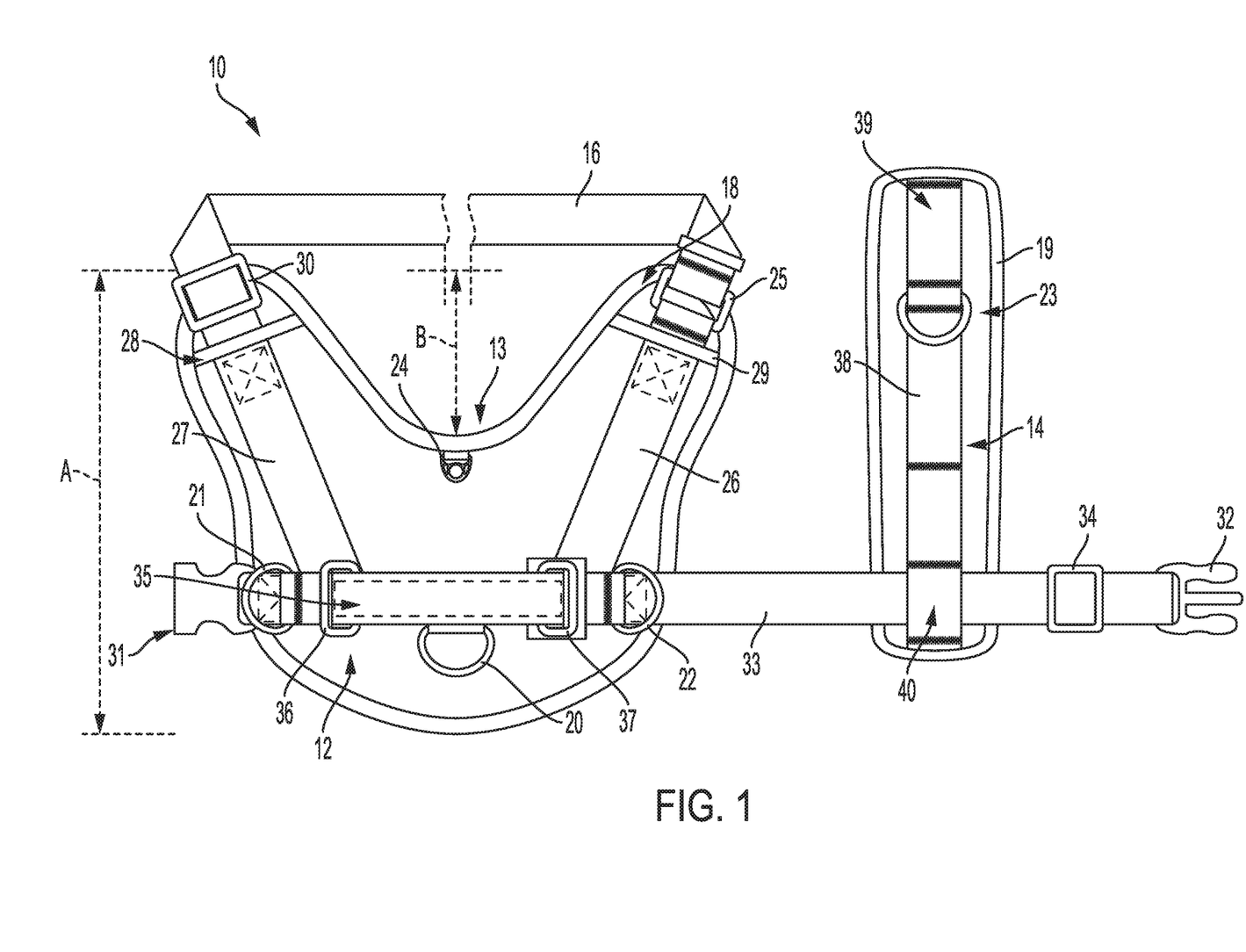
FIG. 1 is a top view of a training harness in accordance with an aspect of the disclosure.
Figure 2:
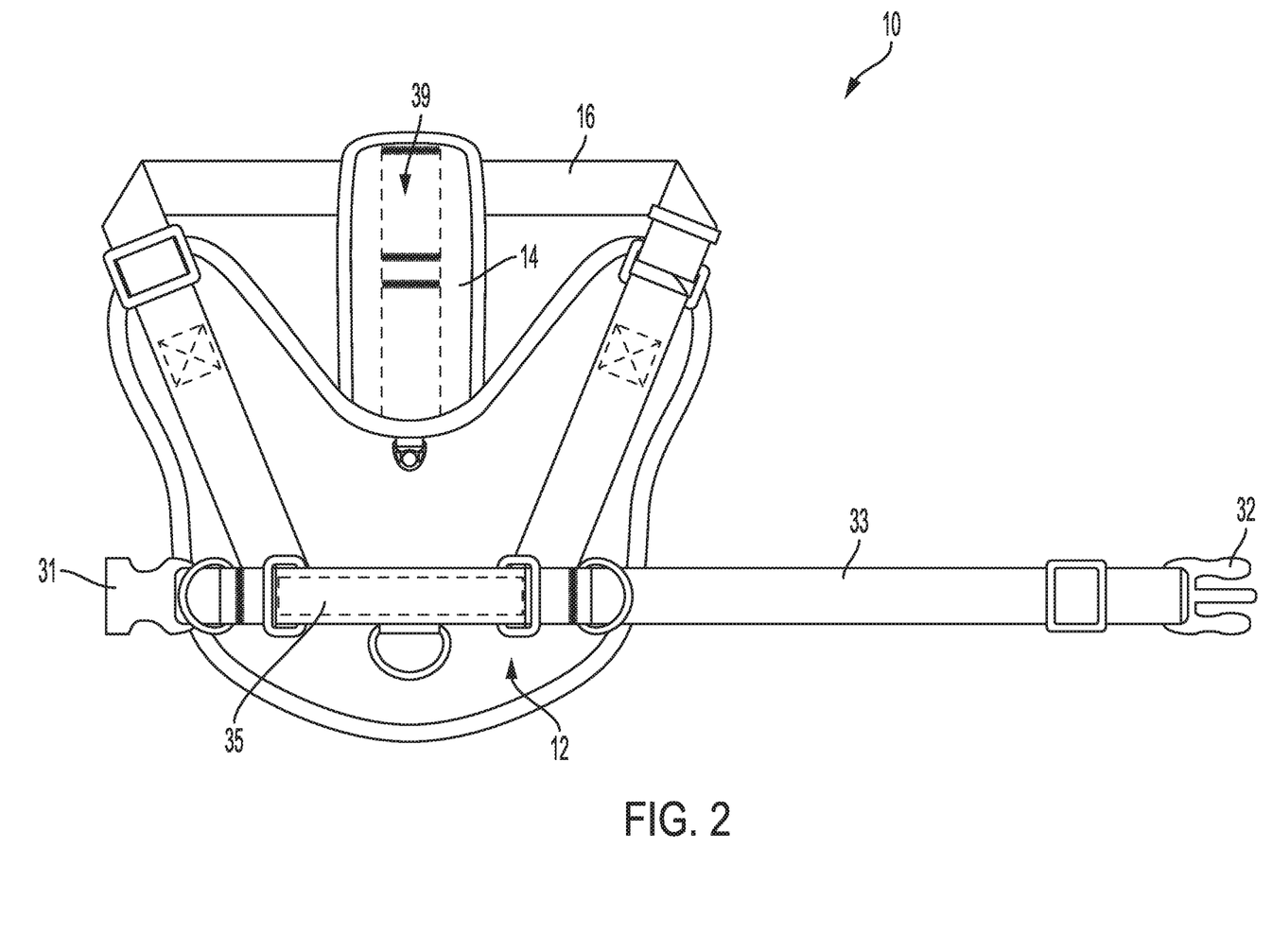
FIG. 2 is a top view of the training harness of FIG. 1 in another configuration.

Referring to FIGS. 1-2, an ergonomic training harness 10 in accordance with an aspect of the disclosure is shown. While ergonomic training harness 10 may most commonly be configured for use with dogs, it is to be understood that ergonomic training harness 10 could be sized and configured for use on other animals, as well, and is not limited to use with dogs. As illustrated, ergonomic training harness 10 includes two separate panels: a back panel 12 and a chest panel 14. Both back panel 12 and chest panel 14 may be formed of the same materials. For example, an outward-facing surface of back panel 12 and chest panel 14 (i.e., the surfaces shown in FIGS. 1-2) may be formed of any resilient material such as, e.g., water-resistant "ripstop" nylon, while the inward-facing surface of the back panel 12 and chest panel 14 (i.e., the surfaces facing the animal) may be formed of another material such as, e.g., a padded neoprene material, as will be described in more detail with respect to FIG. 3.

The edges of both back panel 12 and chest panel 14 may include a respective binding 18, 19. Bindings 18, 19 may include reflective material interwoven or otherwise formed thereon so as to increase visibility of the animal in low-light environments. Additionally, while not shown in FIGS. 1-2, it is to be understood that the outward-facing surfaces of back panel 12 and/or chest panel 14 may also include reflective properties, such as reflective nylon threads, a reflective coating, etc.

As is shown in FIG. 1, back panel 12 of ergonomic training harness 10 includes a scoop portion 13 positioned at a head end of the animal. As compared to prior art harnesses, scoop portion 13 is much more pronounced, which allows the "wings" of back panel 12 located on either side of scoop portion 13 to more comfortably and securely wrap around the shoulders of the animal. This configuration is particularly beneficial with animals having broad chests, such as certain large dog breeds. In some embodiments, the depth "B" of scoop portion 13 may be approximately 40% of the length "A" of the entire back panel 12, as illustrated in FIG. 10. For example, if length "A" is, e.g., 10¼ inches, depth "B" may be, e.g., 4 inches. However, it is to be understood that length "A" and depth "B" are not limited to these examples, and each may be longer or shorter. However, it is to be understood that scoop portion 13 may have a depth that extends deeper or shallower than that which is shown in FIG. 1. For example, scoop portion 13 may be between 20% and 50% of the length "A" of the entire back panel 12.

Ergonomic training harness 10 may also include a plurality of attachment rings configured to allow one or more leashes or other tethers to be coupled to various regions of the ergonomic training harness 10. Specifically, as shown in FIG. 1, a plurality of attachment rings 20, 21, 22 may be coupled to the back panel 12, while an attachment ring 23 may be coupled to the chest panel 14. By providing multiple attachment rings positioned at various locations, the user has many options as to how and where to secure one or more leashes or other tethers. For example, in some instances, the user may only want to attach a leash at attachment ring 20. However, in other instances, the user may desire to attach a leash at attachment ring 23 located on chest panel 14, which may allow the user greater control in directing the movement of the animal. Each attachment ring 20, 21, 22, 23 may be formed of any sufficiently resilient material, such as metal, plastic, etc., and may be in any suitable shape, e.g. a D-ring shape, an O-ring shape, etc. Furthermore, it is to be understood that ergonomic training harness 10 may utilize more or fewer attachment rings than those shown in FIG. 1.

In addition to the plurality of attachment rings 20, 21, 22, back panel 12 may further include an accessory loop 24 configured for the attachment of, e.g., one or more identification tags, one or more illumination devices, one or more accessories, etc. In some embodiments, accessory loop 24 may be configured as a small plastic loop. However, it is to be understood that accessory loop 24 could be the same as or similar to attachment rings 20, 21, 22.

Figure 4:
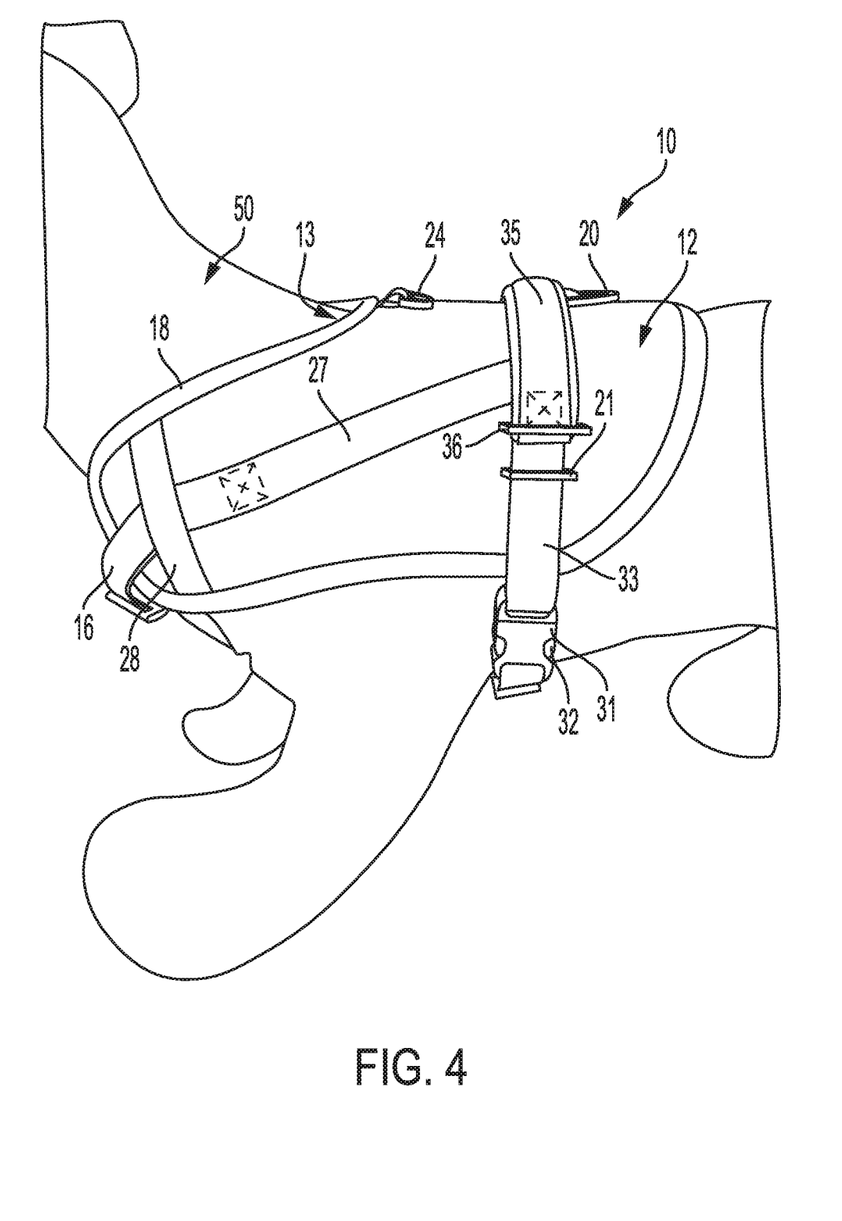
FIG. 4 is a side view of the training harness of FIG. 1 positioned on an animal.
Figure 5:
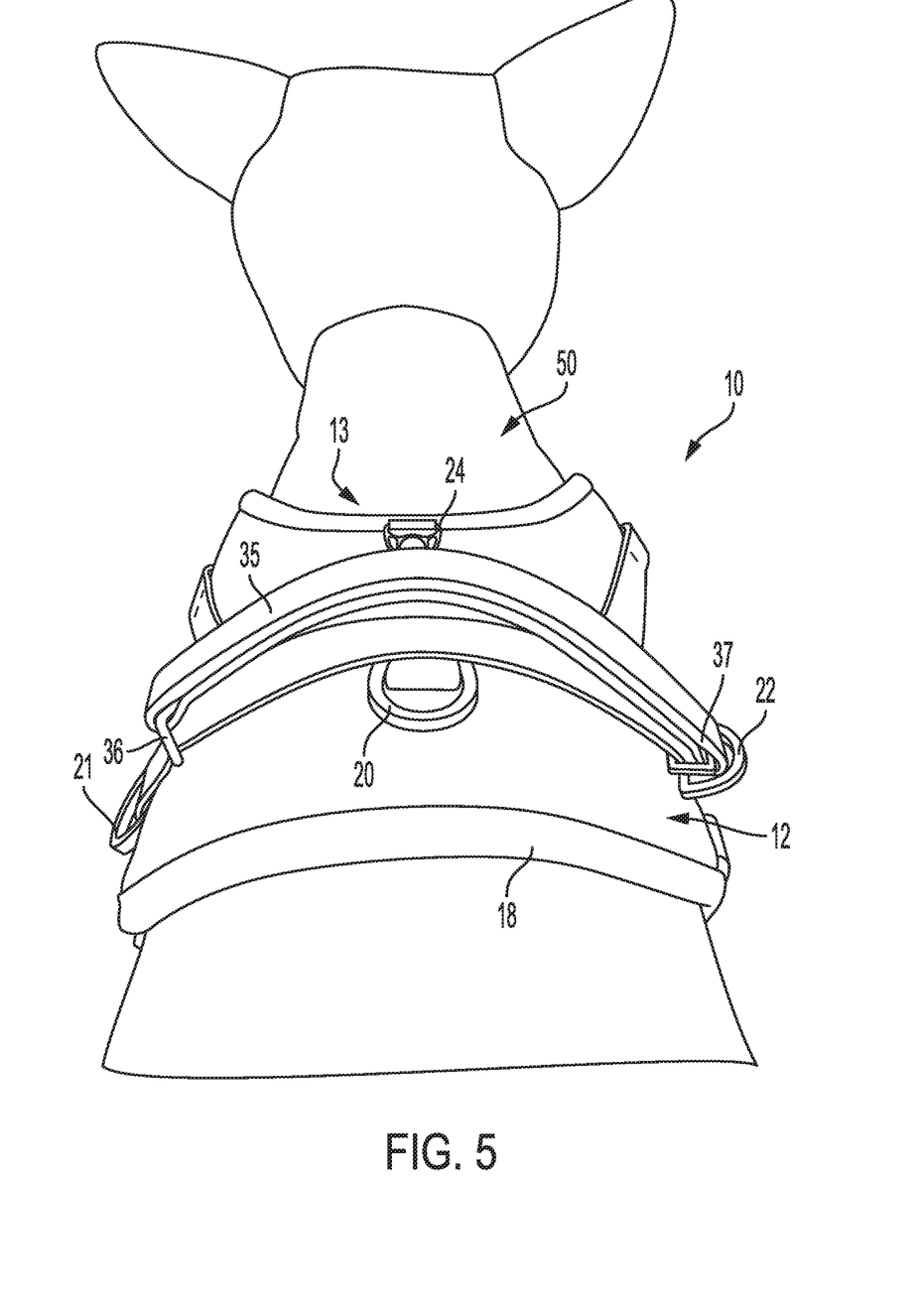
FIG. 5 is a rear perspective view of the training harness of FIG. 1 positioned on an animal.

Referring still to FIG. 1, and as is also shown in FIG. 4, a chest strap 16 is configured to extend across an animal's chest when ergonomic training harness 10 is secured on the animal (such as animal 50 shown in FIGS. 4-5). Chest strap 16 may be formed of any appropriate material, such as, e.g., nylon webbing. Additionally, chest strap 16 may include reflective material woven thereon or applied thereon. One end of chest strap 16 is coupled to a ring 25 (e.g., a rectangular metal ring), while the other end of chest strap 16 is attached to back panel 12 at a strap region 27 by stitching or another means so as to provide a secure connection between the chest strap 16 and back panel 12. The ring 25 is also coupled to a strap region 26, thereby also securing the ring 25 to the back panel 12. An unsecured portion of strap regions 26, 27 may pass through respective elastic bands 28, 29, wherein elastic bands 28, 29 are configured to maintain respective ends of chest strap 16 close to the back panel 12. Additionally, elastic bands 28, 29 may include a reflective stripe so as to provide additionally low-light visibility to the ergonomic training harness 10, particularly to the shoulder area of the animal.

To customize the fit of chest strap 16, an adjuster 30 may be provided. By moving adjuster 30 in either direction along chest strap 16, the opening formed between chest strap 16 and the back panel 12 may be increased or decreased, thereby allowing the user to provide a customized fit to the ergonomic training harness 10 depending upon the size and proportions of the animal. The adjuster 30 may be made of any appropriate material, such as metal, plastic, etc.

In addition to chest strap 16, ergonomic training harness 10 may also include an underbelly strap 33. Underbelly strap 33 may also be formed of any appropriate material, such as, e.g., nylon webbing, and may include reflective material woven therein or applied thereon. Underbelly strap 33 may be configured to wrap around the underbelly (and behind the front legs) of the animal when secured, as shown in FIG. 4. One end of underbelly strap 33 may be secured to a male buckle portion 32, while the other end of underbelly strap 33 may be secured to a female buckle portion 31. Male buckle portion 32 and female buckle portion 31 enable the underbelly strap 33 to be attached and detached quickly, allowing for simplified on/off of the ergonomic training harness 10. Like chest strap 16, underbelly strap 33 may include an adjuster 34, which may be moved to adjust the length of underbelly strap 33 to customize fit across the underbelly of the animal. Furthermore, while not shown in FIGS. 1-5, it is to be understood that underbelly strap 33 may include more than one male buckle portion and more than one female buckle portion, allowing for attachment/detachment of the underbelly strap at multiple locations. Additionally and/or alternatively, while not shown in FIGS. 1-5, chest strap 16 may include one or more male buckle portions and one or more female buckle portions to allow for similar attachment/detachment of chest strap 16.

As is shown in FIGS. 1-2 and 3-5, back panel 12 further includes a handle portion 35 extending from an outward-facing surface. Handle portion 35 allows for a user to physically restrain or direct an animal by hand, as opposed to (or in addition to) via a leash or tether only. Handle portion 35 is coupled to the back panel 12 by way of a pair of hinge members 36, 37. Hinge members 36, 37 allow handle portion 35 to fall to a substantially flat position when not in use, but provide for appropriate clearance between the back panel 12 and the handle portion 35 when gripped by the user. The hinge members 36, 37 may be formed of any appropriate material such as, e.g., metal, plastic, etc. The handle portion 35 may be constructed of materials similar to those used in the construction of back panel 12. For example, an outward-facing surface of handle portion 35 may be formed of, e.g., a water-resistant ripstop nylon material, while an inward-facing surface may be formed of a neoprene material.

Referring again to FIGS. 1-2, chest panel 14 also includes a longitudinal strap 38 extending longitudinally from one end region of chest panel 14 to the other end region of chest panel 14. Like chest strap 16 and underbelly strap 33, strap 38 may be formed of any appropriate material such as, e.g., nylon webbing, and may also include reflective material. Strap 38 includes two loop portions 39, 40 at opposite ends of chest panel 14, wherein loop portions are sized and configured to allow through passage of chest strap 16 and underbelly strap 33, respectively. In this way, chest panel 14 is associated with back panel 12 to form the ergonomic training harness 10, but is movable relative to both chest strap 16 and underbelly strap 33, allowing for side-to-side adjustment of chest panel 14. As chest panel 14 is coupled to both the chest strap 16 and the underbelly strap 33, the chest panel 14 may act to distribute forces across the animal's chest that would otherwise be concentrated on only the chest strap 16 or the underbelly strap 33, providing for a safer and more comfortable training harness for the animal.

Figure 3:
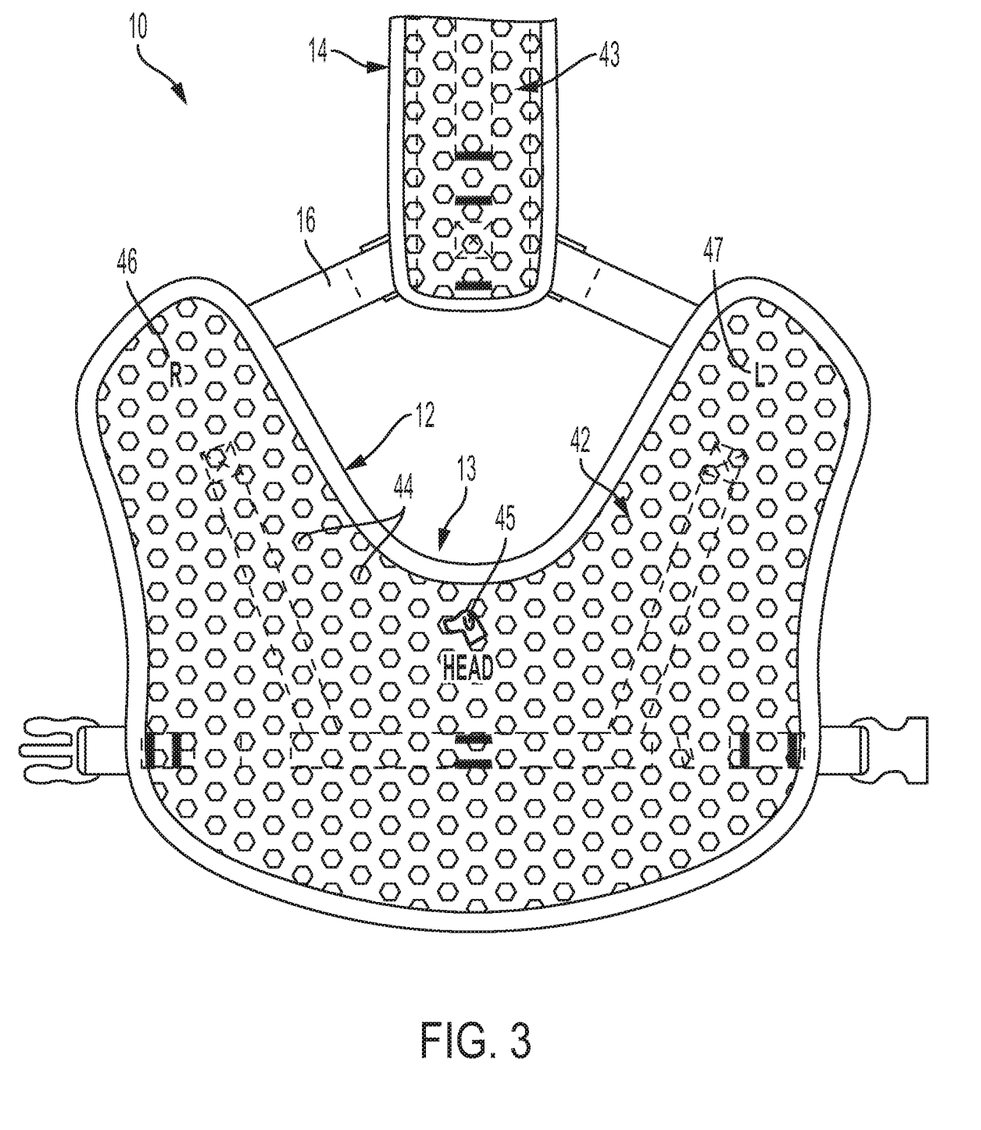
FIG. 3 is a bottom view of the training harness of FIG. 1.

FIG. 3 illustrates an inward-facing surface 42 of back panel 12, along with an inward-facing surface 43 of chest panel 14. As noted above, the inward-facing surfaces 42, 43 may be formed of any appropriate material such as, e.g., a neoprene material. Additionally, inward facing surfaces 42, 43 may include convex-shaped elements 44 which allow the inward facing surfaces 42, 43 to rest slightly offset from the animal's body, allowing for greater breathability. Additionally, the inward-facing surface 42 of back panel 12 may include indicia 45, 46, 47, which provide the user with a guide as to the correct orientation of the back panel 12 when securing to an animal. For example, indicia 45 may include a representation of a dog's head to indicate where the animal's head is to be located relative to the back panel 12, while indicia 46, 47 may indicate where the back panel 12 should lay on the animal's right and left shoulders, respectively. In this way, the user may easily determine the correct orientation of the ergonomic training harness 10 so as to avoid incorrect placement on the animal. Indicia 45, 46, 47 may be applied to the inward-facing surface 42 via any appropriate method, such as printing, stitching, etc. Additionally and/or alternatively, the indicia 45, 46, 47 may be applied to the outward-facing surface of back panel 12.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An ergonomic training harness for use with an animal, the harness
   comprising:
   a back panel having: an outward-facing surface; an inward-facing surface; and a handle portion extending from outward-facing surface of the back panel and coupled to the back panel by a pair of hinge members;
   a chest panel having an outward-facing surface and an inward-facing surface;
   a chest strap having a first end and a second end, wherein each of the first end and the second end are coupled to the back panel;
   an underbelly strap coupled to the back panel; and
   a longitudinal strap coupled to the chest panel, the longitudinal strap having a first loop portion and a second loop portion,
   wherein the chest strap is configured to pass through the first loop portion of the longitudinal strap and the underbelly strap is configured to pass through the second loop portion of the longitudinal strap.

2. The ergonomic training harness of claim 1, wherein the underbelly strap comprises a first end and a second end, and further wherein the first end is coupled to a female buckle portion and the second end is coupled to a male buckle portion sized and configured to be releasably secured within the female buckle portion.

3. The ergonomic training harness of claim 1, further comprising at least one attachment ring coupled to the back panel and at least one attachment ring coupled to the chest panel.

4. The ergonomic training harness of claim 3, wherein the at least one attachment ring coupled to the back panel comprises three attachment rings.

5. The ergonomic training harness of claim 3, wherein the at least one attachment ring coupled to the back panel and the at least one attachment ring coupled to the chest panel are each formed as a D-ring.

6. The ergonomic training harness of claim 1, further comprising at least one accessory loop coupled to back panel.

7. The ergonomic training harness of claim 1, further comprising a length adjuster coupled to each of the chest strap and the underbelly strap.

8. The ergonomic training harness of claim 1, wherein the outward-facing surface of both the back panel and the chest panel is formed of a ripstop nylon material.

9. The ergonomic training harness of claim 1, wherein the inward-facing surface of both the back panel and the chest panel is formed of a neoprene material.

10. The ergonomic training harness of claim 9, wherein the neoprene material includes a plurality of convex-shaped elements.

11. The ergonomic training harness of claim 1, wherein at least one of the back panel, the chest panel, the chest strap, the underbelly strap, and the longitudinal strap includes one of a reflective woven material and a reflective coating.

12. The ergonomic training harness of claim 1, wherein edge portions of both the back panel and the chest panel include bindings, and further wherein each of the bindings include a reflective material.

13. The ergonomic training harness of claim 1, wherein the inward-facing surface of the back panel further includes orientation indicia.

14. An ergonomic training harness for use with an animal, the harness comprising:
    a back panel;
    a chest panel;
    a chest strap attached to the back panel and removably coupled to the chest panel; and an underbelly strap attached to the back panel and removably coupled to the chest panel,
wherein the back panel comprises a scoop portion configured to be positioned at or near a head of the animal, the scoop portion extending approximately 40% of an overall length of the back panel.

15. The ergonomic training harness of claim 14, wherein the chest panel comprises a longitudinal strap, the longitudinal strap having a first loop portion and a second loop portion, and further wherein the chest strap is configured to pass through the first loop portion of the longitudinal strap and the underbelly strap is configured to pass through the second loop portion of the underbelly strap.

16. The ergonomic training harness of claim 14, further comprising a handle portion extending from the back panel.

17. The ergonomic training harness of claim 14, further comprising at least one attachment ring coupled to the back panel and at least one attachment ring coupled to the chest panel.

18. An ergonomic training harness for use with an animal, the harness comprising:
    a back panel having an outward-facing surface and an inward-facing surface;
    a chest panel having an outward-facing surface and an inward-facing surface;
    a chest strap having a first end and a second end, wherein each of the first end and the second end are coupled to the back panel;
    an underbelly strap coupled to the back panel; and
    a longitudinal strap coupled to the chest panel, the longitudinal strap having a first loop portion and a second loop portion,
    wherein: the chest strap is configured to pass through the first loop portion of the longitudinal strap and the underbelly strap is configured to pass through the second loop portion of the longitudinal strap; the inward-facing surface of both the back panel and the chest panel is formed of a neoprene material; and the neoprene material includes a plurality of convex-shaped elements.

19. An ergonomic training harness for use with an animal, the harness comprising:
    a back panel having an outward-facing surface and an inward-facing surface;
    a chest panel having an outward-facing surface and an inward-facing surface;
    a chest strap having a first end and a second end, wherein each of the first end and the second end are coupled to the back panel;
    an underbelly strap coupled to the back panel; and
    a longitudinal strap coupled to the chest panel, the longitudinal strap having a first loop portion and a second loop portion,
    wherein: the chest strap is configured to pass through the first loop portion of the longitudinal strap and the underbelly strap is configured to pass through the second loop portion of the longitudinal strap; and the inward-facing surface of the back panel includes orientation indicia.

20. An ergonomic training harness for use with an animal, the harness comprising:
    a back panel;
    a chest panel comprising a longitudinal strap, the longitudinal strap having a first loop portion and a second loop portion;
    a chest strap attached to the back panel and removably coupled to the chest panel; and
    an underbelly strap attached to the back panel and removably coupled to the chest panel, wherein: the back panel comprises a scoop portion configured to be positioned at or near a head of the animal; the scoop portion extends between 20% and 50% of an overall length of the back panel; the chest strap is configured to pass through the first loop portion of the longitudinal strap; and the underbelly strap is configured to pass through the second loop portion of the underbelly strap.

* * * * *